US010294170B2

(12) United States Patent
Obrestad et al.

(10) Patent No.: US 10,294,170 B2
(45) Date of Patent: May 21, 2019

(54) CONDITIONING AGENT FOR A PARTICULATE FERTILIZER FOR REDUCING HYGROSCOPICITY AND DUST FORMATION

(71) Applicant: YARA INTERNATIONAL ASA, Oslo (NO)

(72) Inventors: Torstein Obrestad, Ulefoss (NO); Terje Tande, Langesund (NO)

(73) Assignee: YARA INTERNATIONAL ASA, Oslo (NO)

( * ) Notice: Subject to any disclaimer, the term of this patent is extended or adjusted under 35 U.S.C. 154(b) by 102 days.

(21) Appl. No.: 15/518,557

(22) PCT Filed: Nov. 25, 2015

(86) PCT No.: PCT/EP2015/077603
§ 371 (c)(1),
(2) Date: Apr. 12, 2017

(87) PCT Pub. No.: WO2016/083435
PCT Pub. Date: Jun. 2, 2016

(65) Prior Publication Data
US 2017/0283339 A1    Oct. 5, 2017

(30) Foreign Application Priority Data
Nov. 26, 2014  (NO) .................................. 20141420

(51) Int. Cl.
| | | |
|---|---|---|
| *C09D 191/06* | (2006.01) | |
| *C05G 3/00* | (2006.01) | |
| *B01J 2/30* | (2006.01) | |
| *C05C 1/00* | (2006.01) | |
| *C05C 11/00* | (2006.01) | |
| *C05C 9/00* | (2006.01) | |
| *C05C 3/00* | (2006.01) | |
| *C05C 5/00* | (2006.01) | |
| *C05C 5/04* | (2006.01) | |

(52) U.S. Cl.
CPC .............. *C05G 3/0088* (2013.01); *B01J 2/30* (2013.01); *C05C 1/00* (2013.01); *C05C 3/005* (2013.01); *C05C 5/005* (2013.01); *C05C 5/04* (2013.01); *C05C 9/005* (2013.01); *C05C 11/00* (2013.01); *C05G 3/0029* (2013.01); *C05G 3/0035* (2013.01); *C05G 3/0041* (2013.01); *C09D 191/06* (2013.01)

(58) Field of Classification Search
None
See application file for complete search history.

(56) References Cited

U.S. PATENT DOCUMENTS

| | | | | | |
|---|---|---|---|---|---|
| 3,660,334 | A | * | 5/1972 | Apikos .................... | C08L 91/06 524/219 |
| 4,898,751 | A | * | 2/1990 | Dwivedy ................... | B01J 2/30 106/230 |
| 5,603,745 | A | * | 2/1997 | Pettersen .................... | B01J 2/30 71/58 |
| 5,858,055 | A | * | 1/1999 | Jahnke ................. | C05G 3/0064 71/27 |
| 6,355,083 | B1 | * | 3/2002 | Ogzewalla ........... | C05G 3/0035 252/384 |
| 2008/0035881 | A1 | * | 2/2008 | Kim ........................ | C09D 5/008 252/71 |

FOREIGN PATENT DOCUMENTS

| | | |
|---|---|---|
| EP | 0 320 987 | 9/1993 |
| EP | 1 390 322 | 5/2006 |
| JP | 09-505796 | 6/1997 |
| JP | 09-249478 | 9/1997 |
| JP | 10-216499 | 8/1998 |
| JP | 2008-542170 | 11/2008 |
| NO | 311424 | 5/2001 |
| WO | 96/00199 | 1/1996 |
| WO | 97/19030 | 5/1997 |

(Continued)

OTHER PUBLICATIONS

Preliminary Notice of Reasons for Rejection dated Jun. 19, 2018 in Japanese Patent Application No. 2017-527725, with English Translation.
International Search Report and Written Opinion of the International Searching Authority dated Mar. 7, 2016 in International (PCT) Application No. PCT/EP2015/077603.
International Preliminary Report on Patentability dated Nov. 2, 2016 in International (PCT) Application No. PCT/EP2015/077603.
Norwegian Search Report dated May 6, 2015 in Norwegian Application No. 20141420.

(Continued)

*Primary Examiner* — Wayne A Langel
(74) *Attorney, Agent, or Firm* — Wenderoth, Lind & Ponack, L.L.P

(57) ABSTRACT

The invention relates to a conditioning agent for reducing water absorption and dust formation of a particulate fertilizer, comprising 10 to 50 weight % of wax, 40 to 90 weight % of mineral oil and 1 to 15 weight % of a resin being mineral oil-soluble and miscible with wax and mineral oil, wherein the agent further comprises 0.1 to 1 weight % of a viscoelastic elastomer selected from the group of polyisobutylene and styrene-isoprene-styrene block copolymer which is soluble in mineral oil and has an average molecular weight of 30.000 to 5.000.000. The invention further relates to a particulate fertilizer composition, preferably a urea-ammonium sulfate (UAS) fertilizer, a urea fertilizer or a calcium nitrate fertilizer, comprising a particulate substrate, preferably an hygroscopic fertilizer, preferably a nitrogen-containing fertilizer, and 0.05 to 2 weight % of said coating thereon for reducing moisture uptake and dust formation of said fertilizer.

19 Claims, No Drawings

(56) References Cited

FOREIGN PATENT DOCUMENTS

| WO | 00/60012 | 10/2000 |
| WO | 01/38263 | 5/2001 |
| WO | 02/090295 | 11/2002 |

OTHER PUBLICATIONS

"Butylated Hydroxytoluene", downloaded from internet Apr. 29, 2015, with WayBack Machine capture from www.chemicalland21.com dated Feb. 24, 2017, cited in CC.

* cited by examiner

CONDITIONING AGENT FOR A PARTICULATE FERTILIZER FOR REDUCING HYGROSCOPICITY AND DUST FORMATION

INTRODUCTION

The invention relates to a conditioning agent comprising a wax, a mineral oil, an elastomer and a resin for the manufacture of a coating, suitable to be used on a particulate fertilizer, preferably an hygroscopic particulate fertilizer, preferably a nitrogen-containing hygroscopic particulate fertilizer. The present invention further relates to a particulate fertilizer composition comprising a particulate substrate, preferably an hygroscopic fertilizer, preferably a nitrogen-containing hygroscopic fertilizer, and 0.05 to 2 weight % of said coating thereon for reducing moisture uptake and dust formation of said fertilizer.

It has been known for a long time that hygroscopic particulate fertilizers like NP-fertilizers and especially calcium nitrate (CN) will cause problems when they are exposed to moisture. The absorbed moisture will result in caking of the particles, and the formation of dust during handling will also thereby increase. Handling of the product in bulk will be accordingly impossible unless these problems are solved. At normal humidity, said problems can be solved by application of known conditioning agents. However, at a temperature and humidity which are experienced in tropical and subtropical areas, the problem still persists. Known conditioning agents are not sufficiently waterproof or impervious to prevent absorption of moisture unless large amounts of coating are used. Using large amounts will reduce the dust formation, but it will usually make the coated fertilizer particles sticky, which again may result in several problems.

BACKGROUND PRIOR ART

EP 0 320 987 B1 (Norsk Hydro, 1989) claims a conditioning agent for reducing dust formation and moisture uptake in a nitrate-containing fertilizer, comprising 10-60 weight % wax, 30-90 weight % oil and 0.3-10 weight % of a high-molecular viscoelastic elastomer which is soluble in oil and has an average molecular weight of 30.000-5.000.000. The preferred wax is a mixture of paraffin wax, polyethylene wax and microcrystalline wax. The preferred viscoelastic elastomer is polyisobutylene (PIB). This conditioning agent is usually applied in amounts of 0.3 weight %, with respect to the weight of the fertilizer and at normal humidities, it gives excellent results, even for hygroscopic fertilizers like CN. However, at humidities often occurring in tropical and subtropical areas, fertilizers coated with this agent, will absorb moisture in unacceptable amounts. Application of more than 0.5 weight % of the agent reduced the moisture absorption markedly, but the fertilizer became too sticky for being handled by conventional means.

EP 0 768 993 B1 (Norsk Hydro, 1997) again addressed the problem of reducing dust formation and hygroscopicity in particulate nitrate-containing fertilizer under tropical conditions. It was found that the reason for the tendency to stickiness was mainly related to the elastomer component in the conditioning agent. Accordingly, this component was substituted with a resin component having somewhat different properties, being oil-soluble and miscible with wax and oil. Hence, the patent claimed a conditioning agent for reducing dust formation and moisture uptake in nitrate-containing fertilizer, comprising 10-50 weight % wax, 40-90 weight % oil and 1-30 weight % of a resin being oil-soluble and miscible with wax and oil. The use of a viscoelastic elastomer component like polyisobutylene was discouraged. This coating is marketed by Yara International ASA under the trade name Tropicote™. The use of the elastomer component was marginally addressed in two similar patent documents WO 01/38263 A1 (Norsk Hydro, 2001) and EP 1 390 322 B1 (Yara International ASA, 2004), both dealing with the use of a bio-degradable conditioning agent comprising a vegetable oil, which is to be avoided in the current application, as well animal and marine oils because such oils will often cause an awful smell in tropical and subtropical environments.

WO 01/38263 addresses the problem of reducing hygroscopicity, caking and dust formation in particulate fertilizers such as NP, NPK, AN, CAN, urea, and other nitrogen-containing fertilizers. The patent document claims a conditioning agent, comprising 1-60 weight % wax, 5-90 weight % oil, which is a vegetable oil, an animal oil, or a marine oil, especially herring oil, and 5-90 weight % resin being oil-soluble and miscible with wax and oil, which is a fish oil distillation residue. Polyisobutylene, which is a bio-degradable elastomer, can optionally be added in an amount of 0 to 5 weight %. Example 5 shows a conditioning agent comprising 39.4 weight % wax, 34.6 weight % oil, 22.0 weight % resin and 4 weight % polyisobutylene.

Similarly, EP 1 390 322 addresses the problem of reducing caking and dust formation in particulate fertilizers such as NP, NPK, AN, CAN, urea, and other nitrogen-containing fertilizers. The patent document claims a conditioning agent, comprising 5-50 weight % wax, 5-75 weight % oil, which is a vegetable oil, an animal oil, or a marine oil, 0-60 weight % resin being oil-soluble and miscible with wax and oil, which is a fish oil distillation residue, and 2 to 15 weight % of a surface active agent, such as arylalkylsulphonate, phosphates, glutinates, or other anionic and/or cationic surface active agents. Polyisobutylene, which is a bio-degradable elastomer, can optionally be added in an amount of 0 to 5 weight %.

DETAILED DESCRIPTION OF THE INVENTION

The main object of the present invention was to arrive at a conditioning agent, suitable to be used on a particulate fertilizer, in particular an hygroscopic particulate fertilizer, in particular a nitrogen-containing hygroscopic fertilizer, more in particular a nitrate-containing hygroscopic fertilizer, which reduces the dust formation, especially formation of fine dust, during handling of the fertilizer particles, and at the same time reduces the moisture absorption at least as much as the application of known conditioning agents, without making the fertilizer particles sticky and thereby reducing their flowability, at conditions of temperature and humidity that exist in tropical and subtropical areas.

A further object of the present invention was to arrive at a conditioning agent that is waterproof or impervious at conditions of temperature and humidity that exist in tropical or subtropical areas, that is flexible within the actual operating temperatures, that is easy to apply, that can be applied to fertilizer particles by conventional coating or conditioning equipment, and that should be non-toxic to the soil and plants. This latter requirement implies that the various components must be environmentally acceptable, though not necessarily bio-degradable. From an economical point of view, the conditioning of the fertilizer particles should be performed in a single step, thereby obtaining the required protection of the particles. A further object was that the agent should be completely soluble after a few days, subsequent to application of the fertilizer to the soil and that the agent should be degradable in the soil.

Another object of the present invention was to arrive at an agricultural composition comprising an hygroscopic particulate fertilizer, in particular a nitro-gen-containing hygroscopic fertilizer, more in particular a nitrate-containing hygroscopic fertilizer having a reduced tendency for moisture absorption, while at the same time minimizing caking and dust formation during handling and storage of the fertilizer particles, especially at high humidity and temperatures, conditions that are occurring in tropical and subtropical areas.

According to the invention, this object is achieved by providing a conditioning agent, comprising 10 to 50 weight % of wax, 40 to 90 weight % of a mineral oil and 1 to 15 weight % of a resin being mineral oil-soluble and miscible with wax, wherein the agent further comprises 0.1 to 1 weight % of a viscoelastic elastomer which is soluble in mineral oil and has an average molecular weight of 30.000 to 5.000.000.

More in particular, according to the invention, this object is achieved by providing a conditioning agent, comprising 15 to 35 weight % of wax, 50 to 70 weight % of a mineral oil and 2 to 8 weight % of a resin being mineral oil-soluble and miscible with wax and mineral oil, wherein the agent further comprises 0.1 to 0.5 weight % of a viscoelastic elastomer which is soluble in mineral oil and has an average molecular weight of 30.000 to 5.000.000.

Surprisingly, and in contradiction to the findings in EP 0 768 993 B1, it was found that a small amount (i.e. between 0.1 to 1 weight %, more in particular between 0.1 to 0.5 weight %) of a viscoelastic elastomer in the composition of a conditioning agent comprising wax, a mineral oil and a resin, was beneficial and provides a conditioning agent that, applied onto a particulate fertilizer, has better properties with regard to both dust binding and reduction of water absorption as compared to the conditioning agent as disclosed in EP 0 768 993 B1.

Within the context of this application, a tropical climate is defined, according to the Köppen climate classification, as a non-arid climate in which all twelve months have mean temperatures of at least 18° C. It comprises in particular the (humid) subtypes tropical rainforest climate, tropical monsoon climate and tropical wet savanna climate. A tropical climate is simulated by exposing the fertilizer and/or the coating to a temperature in the range of 25 to 30° C. and 70 to 85 relative humidity (RH). Sometimes, the term subtropical is used when referring to test conditions of 25° C. and 70% relative humidity (RH).

Wax Component

It was found that the wax component was not very critical, though careful selection of this component would give optimal effects. Useful types of wax in the conditioning agent according to the invention are petroleum wax, such as paraffin wax, intermediary wax and microcrystalline wax; vegetable wax, such as carnauba wax; animal wax, such as beeswax; and any mixture of two or more of the aforementioned waxes.

Paraffin waxes are defined as predominantly straight-chain saturated hydrocarbons with smaller proportions of branched-chain and cyclo-paraffinic compounds.

Intermediary waxes are mixtures of straight-chain, branched-chain and cyclo-paraffinic compounds, intermediate in character between those of paraffin and microcrystalline waxes.

Microcrystalline waxes are hydrocarbons of higher average molecular weight than those of paraffin waxes with a wider range of components containing a high portion of branched-chain and cyclo-paraffinic hydrocarbons.

Vegetable and animal waxes are synthesized by many plants and animals. Those of animal origin typically consist of wax esters, derived from a variety of carboxylic acids and fatty alcohols. In waxes of plant origin, characteristic mixtures of unesterified hydrocarbons may predominate over esters. The composition depends not only on species, but also on geographic location of the organism. Because they are mixtures, naturally produced waxes are softer and melt at lower temperatures than the pure components.

In order to obtain the congealing point of interest, the wax system used needs to have the right melting point. Normally, waxes are selected to obtain a congealing point between 37 and 43° C.

A preferred intermediary wax is a Slack wax, obtainable from various manufacturers, such as EmuTec AB (Kristinehamm, Sweden)) and Sasol Wax Gmbh (Hamburg, Germany). Slack waxes are minimally refined high oil products. They are derived from lubricating oils and often find applications "as they are" with relatively high oil content, or are further processed to produce more refined waxes. Slack waxes range from 40° C. to 65° C. in melting point, and their oil content ranges from 5.0% to as much as 35%.

The conditioning agent according to the invention comprises 10 to 50 weight %, preferably 15 to 35 weight, more preferably 20 to 30 weight %, most preferably about 27-28 weight % of wax.

Resin Component

The resin component of the new conditioning agent must be soluble in the mineral oil component and miscible with the wax and the mineral oil component of the composition according to the invention. Furthermore, it must give the resulting coating the required elasticity, without being sticky during application on the particles and during their handling and storage. The resulting coating should be hard and glassy or being able to impregnate the particle surface. Also, this component should be environmentally acceptable and degradable in the soil as explained above. Within the above framework, the resin component can be chosen from the group of synthetic resins and natural resins.

Synthetic resins comprise resins, such as coumarone-indene resins (synthetic resins of low molecular weight produced by polymerization of mixtures of unsaturated compounds, primarily indene and coumarone, which have been extracted from the by-products of coal coking (crude benzene) and from the aromatic high-boiling products of petroleum pyrolysis), esterified natural resins such as rosin, for example pentaerythritol rosin ester, phenol formaldehyde resins, furfuryl alcohol resins, polyester resins and polyurethane resins.

Natural resins are primarily derived from trees and shrubs and comprise amorphous mixtures of carboxylic acids, essentially oil and terpenes. Examples of useful natural resins are rosin, copal, mastic, balsam and damar.

Preferred resins are non-crystalline tall oil-rosin, pentaerythritol esters of stabilized resin acids and pentaerylthritol esters from polymerized rosin.

Most preferred resins are pentaerythritol rosin esters and coumarone-indene resins, for example obtainable from Neville Chemical Company (Pittsburgh, USA).

The conditioning agent according to the invention comprises 1 to 15 weight %, preferably 2 to 8 weight %, more preferably 3 to 7 weight %, most preferably about 4 weight % resin.

Mineral Oil Component

The mineral oil component is basically a carrier or solvent for the wax and resin components, but does also have some effect on reducing the dust formation during handling of the fertilizer.

Mineral oils (sometimes called white oils) are any of various colorless, odorless, light mixtures of higher alkanes having moderate viscosity, low volatility and a high flash point, originating from a non-vegetable (mineral) source, in particular a distillate of petroleum (process oils). They may be selected from the group of paraffinic oils (based on n-alkales), naphthenic oils (based on cycloalkanes) and aromatic oils (based on aromatic hydrocarbons). They may be hydrotreated. Refined mineral oils will also be applicable, but are not recommended from an environmental point of view.

Vegetable oils, such as triglycerides, extracted from plants or the seeds thereof, such as corn oil, canola oil, rapeseed oil, sunflower oil, soya oil, linseed oil or mixtures thereof, but also animal oils and marine oils are to be avoided as these oils degrade rapidly in (sub)tropical conditions and/or produce a awful smell.

Most preferred mineral oils are naphthenic process oils, such as obtainable for Nynas AB, Stockholm, Sweden and paraffinic process oils, such as obtainable from Total Lubricants, Nanterre, France.

The conditioning agent according to the invention comprises 40 to 90 weight %, preferably 50 to 70 weight %, most preferably about 67 to 68 weight % of a mineral oil.

Elastomer Component

The elastomer component is a high molecular weight viscoelastic elastomer which is soluble in the mineral oil used and has an average relative molecular mass (viscosity average, g/mol) of 30.000 to 5,000.000.

According to a preferred embodiment of the invention, the elastomer comprised in the conditioning agent is polyisobutylene having an average relative molecular mass (viscosity average, g/mol) of 40,000 to 1,300,000. In a further preferred embodiment, the elastomer may as well consist of a styrene-isopropene-styrene block copolymer, styrene-butadiene-styrene block copolymer, styrene-ethylene/butylene block copolymer, and styrene-butadiene block copolymer.

A most preferred elastomer is polyisobutylene with a relative molecular mass (viscosity average, g/mol) of about 1,000,000, such as Oppanol B100, obtainable from BASF (Germany). It has an intrinsic viscosity (Staudinger Index) of 241-294 $cm^3/g$.

The conditioning agent according to the invention comprises 0.1 to 1 weight %, preferably 0.1 to 0.5 weight %, most preferably about 0.25 weight % elastomer. The maximum amount of elastomer should not exceed 1%.

Other Components

In order to improve the shelf life of the coating, an anti-oxidant may be added to the conditioning agent. The inventors have also discovered that the addition of small amounts of t-butyl hydroxytoluene (CAS Nr. 128-37-0) may prolong the shelf life considerably. Hence, this component may additionally be included into the conditioning agent according to the invention.

Coating

By application of the conditioning agent according to the invention to fertilizer particles as a coating, the fertilizer particles are provided with a coating of 0.05 to 2.0 weight %, more preferably 0.05 to 1.0 weight %, more preferably 0.20 to 0.45 weight %, relative to the total weight of the coated fertilizer particles.

The conditioning agent according to the invention will, to some degree, penetrate into the surface and in this way impregnate the surface of the fertilizer particles, especially when these fertilizer particles are somewhat porous. This effect makes it also possible to apply rather large amounts of conditioning agent onto the particles.

On a laboratory scale, the conditioning agent is applied by adding the desired amount of conditioning agent as a melt at 70 to 80° C. into a batch of fertiliser particles, and heated to 30 to 45° C. in a kitchen machine. The conditioning agent and the fertiliser particles are mixed for 2 to 4 minutes and subsequently, the coated fertiliser particles are transferred to a closed PE container for storage and later testing. On an industrial scale, the conditioning agent is sprayed into a coating drum with a retention time 3 to 5 minutes and at the same conditions as mentioned for the laboratory scale setup.

According to a beneficial embodiment, the method comprises a step of mixing the total amount of elastomer into an amount of either the mineral oil or the wax component of the conditioning agent according to the invention, and mixing said elastomer/wax or elastomer/mineral oil component mixture with the other components according to the invention. According to another beneficial embodiment, the elastomer component can also be melted into an amount of paraffin wax and said amount of paraffin wax is subsequently mixed with the other components of the conditioning agent according to the invention. Typically, the elastomer component can be added in an amount ranging from 10 to 50 weight %, preferably 25 weight %, into the paraffin wax (amounts relative to the amount of paraffin wax). The amount of the elastomer/paraffin wax mixture may vary between 1 and 5 weight % with respect to the total weight of the conditioning agent, and if, for example, 25% elastomer in the paraffin/wax mixture is used, the amount of elastomer in the final conditioning agent is typically 0.25-1 weight %. Using the aforementioned step, the elastomer can be more homogeneously dissolved into the conditioning agent composition. The type of paraffin wax can be any type and easily selected by the skilled person. Hence, the invention also relates to a conditioning agent according to the invention, wherein the agent further comprises 1 to 5 weight % of paraffin wax as a second wax component, in addition to the first main wax component, which may also be a paraffin wax, as defined above.

Particulate Fertilizer Composition

The present invention further relates to a particulate fertilizer composition comprising a particulate substrate, in particular an hygroscopic particulate fertilizer, more in particular a nitrogen-containing particulate fertilizer, and 0.05 to 2 weight % of said coating thereon for reducing moisture uptake and dust formation of said fertilizer.

According to one embodiment, the particulate substrate is a nitrogen-containing fertilizer, selected from the group of NP, NK, NPK, AN, CAN, AN with sulfur, urea, urea with sulfur and urea-ammonium sulfate. More in particular, the particulate substrate is a nitrate-containing fertilizer, more in particular an hygroscopic nitrate-containing fertilizer, such as calcium nitrate.

In particular, the invention relates to a particulate urea-ammonium sulfate (UAS) fertilizer, comprising 0.05 to 2 weight % of a coating that comprises the conditioning agent according to the invention, in particular comprising 10 to 50 weight % of wax, 40 to 90 weight % of a mineral oil and 1 to 15 weight % of a resin being mineral oil-soluble and miscible with wax and mineral oil, and 0.1 to 1 weight % of a viscoelastic elastomer which is soluble in mineral oil and has an average molecular weight of 30.000 to 5.000.000.

The coating reduces the rate of water absorption of calcium nitrate by more than 90%, in particular up to 98%, and dust formation by more than 80%, in particular up to 95%, if a coating is used in a concentration of 0.20 to 0.45 weight %, relative to the total weight of the coated fertilizer particles.

The scope of the invention and its special features are as defined by the attached claims.

EXPERIMENTAL

The invention will now be further explained in connection with the Examples.

Dust Measurement

The amount of dust is measured in mg per kg particles and can be measured by two different methods.

Method 1 measures the dust which is released after one minute of fluidizing in a fluidizing apparatus at a certain humidity and temperature.

Method 2 measures the dust formed during wear of the particle surface subsequent to a standard tilting test at a certain humidity and temperature. A sample of the fertilizer is placed in a bottle that is connected to another bottle by means of a tube, 60 cm long, and tilted back and forward 40 times. This test simulates wear during bulk transport.

Water Absorption Measurement

The water absorption reduction was measured after 1, 3, 5 and 24 hours at a specific temperature and relative humidity and is expressed as percent weight increase (water absorbed) by the fertilizer. The amount of water was measured as follows: approximately 20 gram of fertilizer is put on a flat cup to get a monolayer of material. The cup with the fertilizer is weighed accurately and allowed to stand in a climate chamber for up to 24 hours at humidity and temperature mentioned. The weight increase is measured after 1, 3, 5 and 24 hours. The weight increase of the cup and content is taken as water absorbed. The method is performed for uncoated and coated material and the % reduction in water absorption is calculated with reference to the weight of the uncoated fertilizer: for example: if uncoated fertilizer absorbs 10% water and coated fertilizer 1% after 24 h, % reduction is defined as: 100%−(1/10*100)=90% reduction. The climate chamber can be adjusted between 30 to 90% Relative Humidity (Rh) and 15 to 40° C. Fertilizer that has absorbed 3 to 5% water will normally be damaged or have very bad physical quality (severe disintegration, high dust number, large caking tendency, etc.).

Residual Particle Strength Measurement

The particle strength of the fertilizer decreases when exposed to humid air due to the absorption of moisture. To measure the degree of protection of the coating, uncoated and coated material was put as a monolayer into a climate chamber for 5 hours at 80% Rh and 30° C. The particle strength is measured before and after these 5 hours. This is done by first sieving out the particles of size 3.15 mm or larger, placing these particles on a scale and exerting a pressure until the particles break. The force, necessary to break the particles (in kg) is a measure of the particle strength.

If the particle strength decreases from 4-6 kg to below 2-3 kg, the physical quality of the fertilizer is significantly damaged.

Caking Test

Approximately 360 grams of fertilizer is put into an open metal cylinder at about 50% Rh and 25° C. A metal plate is placed on top of the fertilizer and a hydraulic arm is operated to exert a pressure of 2 kg/cm² to the plate.

After 24 hours, the pressure and the top plate is removed and the force needed to break/crush the caked material is measured. This force is taken as the Caking Index (CI). PQR-scores are product quality rating-scores. The optimal value is 100, which indicates "Extremely good".

Experiment 1: Calcium Nitrate

The coating effect of the conditioning agent on calcium nitrate fertilizer particles, obtained from Yara International ASA, according to the invention is compared to uncoated calcium nitrate fertilizer particles as well as to the coating effect of the conditioning agent according to the prior art document EP 0 768 993 B1, the latter which contains all components of the conditioning agent according to the invention, except for the elastomer component. Calcium nitrate is a very hygroscopic material: its Critical Relative humidity (CRH) is <40.

The composition of the conditioning agent was as follows:

| Component | Specification | Prior art | Present invention |
| --- | --- | --- | --- |
| Wax | Intermediary wax mixture | about 28% | about 28% |
| Mineral oil | Naphthenic oil | about 68% | about 68% |
| Resin | pentaerythiol rosin ester | about 4% | about 4% |
| Elastomer | polyisobutylene (PIB) | none | various amounts |
| Second Wax component | paraffin wax | none | about 1.3% |

The conditioning agent was applied to a granulated calcium nitrate fertilizer (obtained from Yara International ASA, Oslo) in an amount of 0.45 weight % with respect to the total weight of the fertilizer, at a temperature of about 80° C. The coated particles were then tested with regard to dust formation (Method 2) and water absorption at 25° C. and 70% relative humidity, and the results of these tests are summarized in Table 1.

TABLE 1

Effect of PIB as coating component for calcium nitrate

| Sample | % Water absorption after | | | | Dust (mg/kg) |
| --- | --- | --- | --- | --- | --- |
| | 1 h | 3 h | 5 h | 24 h | Method 2 |
| Uncoated CN | 4.0 | 10.2 | 16.1 | 46.9 | 2735 |
| Prior art coating | 0.1 | 0.21 | 0.31 | 1.4 | 757 |
| 0.45 weight % coating with 0.30 weight % PIB | 0.08 | 0.18 | 0.27 | 1.2 | 387 |
| 0.45 weight % coating with 0.45 weight % PIB | 0.09 | 0.17 | 0.29 | 1.3 | 315 |

As can be seen from Table 1, small amounts of PIB in the coating strongly improve the dust reduction effect. At the same time, small amounts of PIB do not harm the water repellency of the coating; on the contrary: small amounts of PIB seem to have also a positive effect, if any.

Experiment 2: Urea and Urea-Ammonium Sulphate (UAS)

The coating effect of the conditioning agent on fertilizer particles according to the invention was tested on urea and urea-ammonium sulphate (UAS) fertilizer particles (both obtained from Yara International ASA). Urea is not a very hygroscopic material with a Critical Relative humidity (CRH) of 72.5. On the other hand, mixtures of urea and ammonium sulphate are very hygroscopic with a Critical Relative humidity (CRH) of 56.4.

The tests were run on granular material under tropical and/or subtropical conditions (25-30° C. and 70-80% relative humidity (RH)). The material was heated to 35° C. and coated with various amounts of the conditioning agent according to the invention at a temperature of 70 to 80° C.

The composition of the conditioning agent was as follows:

| Component | Specification | Prior art | Present invention |
|---|---|---|---|
| Wax | Intermediary wax mixture | about 28% | about 28% |
| Mineral oil | Naphthenic oil. About 30% of oil was used to dissolve the PIB | about 68% | about 68% |
| Resin | pentaerythiol rosin ester | about 4% | about 4% |
| Elastomer | polyisobutylene (PIB) | none | about 0.30% |

The coated particles were then tested with regard to dust formation (Method 1), moisture absorption, residual crushing strength after moistening and caking, and the results of these tests are summarized in Tables 2 to 7.

TABLE 2

Effect of coating with PIB on urea at 25° C. and 70% RH

| | Water absorption at 25° C. and 70% RH after | | | | Dust (mg/kg) |
|---|---|---|---|---|---|
| Sample | 1 h | 3 h | 5 h | 24 h | Method 1 |
| Uncoated Urea | 0.25 | 0.29 | 0.33 | 0.59 | 798 |
| Urea + 0.2 weight % coating | 0.09 | 0.13 | 0.17 | 0.41 | 74 |
| Urea + 0.3 weight % coating | 0.07 | 0.11 | 0.15 | 0.35 | 74 |
| Urea + 0.4 weight % coating | 0.04 | 0.08 | 0.11 | 0.27 | 74 |

As can be seen from Table 2, the dust formation for urea fertilizer is dramatically reduced, while also the water absorption after 24 hours is reduced by a factor of about 2 compared to uncoated material.

TABLE 3

Effect of coating with PIB on UAS at 25° C. and 70% RH

| | Water absorption at 25° C. and 70% RH after | | | | Dust (mg/kg) |
|---|---|---|---|---|---|
| Sample | 1 h | 3 h | 5 h | 24 h | Method 1 |
| Uncoated UAS (urea + AS) | 2.21 | 5.26 | 8.22 | 31.7 | 283 |
| UAS + 0.2 weight % coating | 0.11 | 0.19 | 0.26 | 1.21 | 100 |
| UAS + 0.3 weight % coating | 0.04 | 0.07 | 0.11 | 0.51 | 25 |
| UAS + 0.4 weight % coating | 0.02 | 0.04 | 0.08 | 0.31 | 0 |

As can be seen from Table 3, the dust formation for UAS fertilizer is dramatically reduced, while also the water absorption in subtropical conditions (25° C. and 70% RH) after 24 hours is reduced by a factor of about 100 compared to uncoated material.

TABLE 4

Effect of coating with PIB on UAS at 30° C. and 80% RH

| | Water absorption at 30° C. and 80% RH after | | | |
|---|---|---|---|---|
| Sample | 1 h | 3 h | 5 h | 24 h |
| Uncoated UAS (urea + AS) | 5.06 | 13.5 | 21.1 | 66.8 |
| UAS + 0.2 weight % coating | 1.02 | 2.25 | 3.08 | 5.32 |
| UAS + 0.3 weight % coating | 0.22 | 0.49 | 0.69 | 2.58 |
| UAS + 0.4 weight % coating | 0.51 | 1.02 | 1.38 | 2.27 |

As can be seen from Table 4, the water absorption in tropical conditions (30° C. and 80% RH) after 24 hours is reduced by a factor of about 30.

TABLE 5

Effect of coating with PIB on urea at 30° C. and 80% RH

| | Water absorption at 30° C. and 80% RH after | | | |
|---|---|---|---|---|
| Sample | 1 h | 3 h | 5 h | 24 h |
| Uncoated Urea | 2.02 | 5.12 | 7.93 | 28.5 |
| Urea + 0.2 weight % coating | 0.76 | 1.91 | 2.68 | 4.74 |
| Urea + 0.3 weight % coating | 0.38 | 1.11 | 1.77 | 4.13 |
| Urea + 0.4 weight % coating | 0.41 | 0.97 | 1.43 | 3.64 |

As can be seen from Table 5, the water absorption in tropical conditions (30° C. and 80% R H) after 24 hours is reduced by a factor of about 8 compared to uncoated material.

TABLE 6

Residual crushing strength after moistening (5 hours at 80% Rh and 25° C.

| Material | After 0 h (kg) | After 5 h (kg) | Loss of strength (%) |
|---|---|---|---|
| Uncoated UAS (urea + AS) | 5.6 | 1.5 | 73 |
| UAS + 0.2 weight % coating | 5.9 | 3.8 | 36 |
| UAS + 0.3 weight % coating | 5.4 | 4.7 | 13 |
| UAS + 0.4 weight % coating | 5.7 | 4.8 | 16 |
| Uncoated Urea | 4.5 | 3.4 | 24 |
| Urea + 0.2 weight % coating | 4.9 | 4.4 | 10 |
| Urea + 0.3 weight % coating | 4.7 | 4.3 | 8.6 |
| Urea + 0.4 weight % coating | 4.7 | 4.5 | 4.2 |

As can be seen from Table 6, the loss of strength after 24 hours under tropical conditions (30° C. and 80% R H) is reduced by a factor of about 6 compared to uncoated material for both UAS and urea.

TABLE 7

Caking test

| Sample | CI (kg) | PQR score (%) | Quality |
|---|---|---|---|
| Uncoated UAS (urea + AS) | 39 | 80 | Good |
| UAS + 0.2 weight % coating | 13 | 90 | Excellent |

TABLE 7-continued

Caking test

| Sample | CI (kg) | PQR score (%) | Quality |
|---|---|---|---|
| UAS + 0.3 weight % coating | 16 | 90 | Excellent |
| UAS + 0.4 weight % coating | 18 | 90 | Excellent |
| UAS + 0.5 weight % coating | 20 | 90 | Excellent |

As can be seen from Table 7, the caking index (CI) is reduced by a factor of about 2 compared to uncoated UAS material. The highest quality score is obtained by use of the conditioning agent according to the present invention.

By the present invention the inventors have succeeded in arriving at nitrogen-containing fertilizers that can be handled, stored and applied in tropical and subtropical areas without giving problems with regard to the uptake of water, the caking of the particles and dust formation during handling.

The new coating agent achieved is easy to apply during the coating of the fertilizer particles. The resulting coating on the particles makes them free-flowing and non-sticky, even at the high humidities and temperatures existing in tropical and subtropical areas.

The invention claimed is:

1. A conditioning agent composition for reducing water absorption and dust formation of a particulate fertilizer, comprising:
    10 to 50 weight % of a wax,
    40 to 90 weight % of a mineral oil,
    1 to 15 weight % of a resin that is mineral oil-soluble and miscible with wax and mineral oil, and
    0.1 to 1 weight % of a viscoelastic elastomer selected from the group consisting of polyisobutylene and styrene-isoprene-styrene block copolymer, wherein the viscoelastic elastomer is soluble in mineral oil and has an average molecular weight of 30,000 to 5,000,000.

2. The conditioning agent composition according to claim 1, wherein the resin is selected from the group consisting of a synthetic resin, a natural resin, a phenol formaldehyde resin, a furfuryl alcohol resin, a polyester resin, and a polyurethane resin.

3. The conditioning agent composition according to claim 2, wherein the natural resin is an esterified natural resin.

4. The conditioning agent composition according to claim 3, wherein the esterified natural resin is rosin.

5. The conditioning agent composition according to claim 4, wherein the rosin is pentaerythritol rosin ester.

6. The conditioning agent composition according to claim 2, wherein the synthetic resin is a coumarone-indene resin.

7. The conditioning agent composition according to claim 1, further comprising an anti-oxidant.

8. The conditioning agent composition according to claim 7, wherein the anti-oxidant is t-butyl hydroxyltoluene.

9. The conditioning agent composition according to claim 1, comprising:
    15 to 35 weight % of the wax,
    50 to 70 weight % of the mineral oil,
    2 to 8 weight % of a resin being the resin that is mineral oil-soluble and miscible with wax and mineral oil, and
    0.1 to 0.5 weight % of the viscoelastic elastomer.

10. The conditioning agent composition according to claim 1, further comprising 1 to 5 weight % of a paraffin wax as a second wax component.

11. The conditioning agent composition according to claim 1, wherein the wax is at least one wax selected from the group consisting of intermediary wax, paraffin wax, microcrystalline wax, carnauba wax, vegetable wax, and mixtures thereof.

12. The conditioning agent composition according to claim 1, wherein the mineral oil is naphthenic oil.

13. A particulate fertilizer composition comprising a particulate substrate and 0.05 to 2 weight % of a coating comprising the conditioning agent composition according to claim 1.

14. The particulate fertilizer composition according to claim 13, wherein the particulate substrate is a nitrogen-containing fertilizer selected from the group consisting of NP, NK, NPK, ammonium nitrate (AN), calcium ammonium nitrate (CAN), AN with sulfur, urea, and urea-ammonium sulfate (UAS).

15. The particulate fertilizer composition according to claim 14, wherein the particulate substrate is a urea-ammonium sulfate (UAS) fertilizer.

16. The particulate fertilizer composition according to claim 14, wherein the particulate substrate is a urea fertilizer.

17. The particulate fertilizer composition according to claim 14, wherein the particulate substrate is a calcium nitrate fertilizer.

18. A method of applying the particulate fertilizer composition according to claim 13, comprising contacting the particulate fertilizer composition with a plant or a soil in a subtropical or tropical climate.

19. A method for producing the conditioning agent composition according to claim 1, comprising:
    a step of melting 0.1 to 1 weight % of a viscoelastic elastomer selected from the group consisting of polyisobutylene and styrene-isoprene-styrene block copolymer, wherein the viscoelastic elastomer is soluble in mineral oil and has an average molecular weight of 30,000 to 5,000,000, into an amount of paraffin wax, and
    adding the amount of paraffin wax to a mixture comprising 10 to 50 weight % of a wax, 40 to 90 weight % of a mineral oil, and 1 to 15 weight % of a resin that is mineral oil-soluble and miscible with wax and mineral oil,
    to produce the conditioning agent composition.

* * * * *